(12) United States Patent
Okumura

(10) Patent No.: US 7,514,136 B2
(45) Date of Patent: Apr. 7, 2009

(54) HONEYCOMB STRUCTURE

(75) Inventor: Jun Okumura, Nisshin (JP)

(73) Assignee: NGK Insulators, Ltd., Nagoya (JP)

( * ) Notice: Subject to any disclaimer, the term of this patent is extended or adjusted under 35 U.S.C. 154(b) by 174 days.

(21) Appl. No.: 11/583,802

(22) Filed: Oct. 20, 2006

(65) Prior Publication Data

US 2007/0092693 A1 Apr. 26, 2007

(30) Foreign Application Priority Data

Oct. 26, 2005 (JP) ............................. 2005-311113

(51) Int. Cl.
| | | |
|---|---|---|
| B32B 3/12 | (2006.01) | |
| B01D 39/20 | (2006.01) | |
| B01D 39/00 | (2006.01) | |
| B01D 41/00 | (2006.01) | |
| B01D 45/00 | (2006.01) | |
| B01D 46/00 | (2006.01) | |
| B01D 51/00 | (2006.01) | |

(52) U.S. Cl. .................. 428/117; 55/523; 55/282.3; 55/385.3; 55/524; 428/116; 95/273

(58) Field of Classification Search .............. 428/116, 428/117, 118, 119, 188, 913, 327, 73, 307.5, 428/34.5, 177, 304.4, 192; 501/118, 119, 501/120, 153, 154; 55/523, 585.3, 483, 502, 55/529; 264/177.12

See application file for complete search history.

(56) References Cited

U.S. PATENT DOCUMENTS 5,260,035 A * 11/1993 Lachman et al. ............ 422/180

| 2005/0095179 | A1 | 5/2005 | Kasai et al. |
|---|---|---|---|
| 2005/0153099 | A1* | 7/2005 | Yamada ...................... 428/117 |
| 2006/0101747 | A1 | 5/2006 | Masukawa et al. |
| 2006/0191248 | A1* | 8/2006 | Bardhan et al. ............... 55/523 |
| 2006/0192324 | A1 | 8/2006 | Kaneda et al. |
| 2007/0082174 | A1 | 4/2007 | Masukawa et al. |

FOREIGN PATENT DOCUMENTS

| EP | 1 686 108 A1 | 8/2006 |
|---|---|---|
| EP | 1 698 388 A1 | 9/2006 |
| EP | 1 728 544 A1 | 12/2006 |
| JP | A 58-045712 | 3/1983 |
| JP | A 03-202605 | 9/1991 |
| JP | A 2002-219317 | 8/2002 |
| JP | A 2003-260322 | 9/2003 |
| WO | WO 2005/047209 A1 | 5/2005 |
| WO | WO 2005/063360 A1 | 7/2005 |
| WO | WO 2005/089901 A1 | 9/2005 |

* cited by examiner

Primary Examiner—Jennifer McNeil
Assistant Examiner—Nicole T Gugliotta
(74) Attorney, Agent, or Firm—Oliff & Berridge, PLC

(57) ABSTRACT

A honeycomb structure includes a bonded honeycomb segment article in which a plurality of honeycomb segments are integrally bonded on mutual bonding surfaces thereof via bonding material layers; and an outer peripheral coating layer which covers an outer peripheral surface of the bonded honeycomb segment article. The honeycomb structure has a structure in which a plurality of cells constituting fluid channels are arranged in parallel with one another in a central axis direction. Solid cells are beforehand arranged in four corners of each of opposite end faces of the honeycomb segment and/or the center of each side of an outer peripheral portion of each of the opposite end faces of the honeycomb segment, and the solid cells are integrated with the honeycomb segment.

8 Claims, 8 Drawing Sheets

HONEYCOMB STRUCTURE

BACKGROUND OF THE INVENTION

1. Field of the Invention

The present invention relates to a honeycomb structure in which a plurality of honeycomb segments are integrally bonded to one another by bonding material layers. More particularly, it relates to a honeycomb structure in which generation of defects such as cracks due to a thermal stress is effectively prevented during use and regeneration of a collection filter for an exhaust gas, especially a diesel particulate filter (DPF) to collect particulates and the like in the exhaust gas of a diesel engine.

2. Description of the Related Art

A honeycomb structure is incorporated and used as a collection filter for an exhaust gas, for example, a diesel particulate filter (DPF) in an exhaust system or the like of a diesel engine in order to collect and remove particulates included in an exhaust gas from a diesel engine or the like. Such a honeycomb structure has a disadvantage that a temperature rise in the whole honeycomb structure easily becomes non-uniform, and defects such as cracks are generated owing to a thermal stress during use (when the particulates are collected and removed) and during regeneration (when the particulates deposited in the filter are burnt and removed in order to eliminate an increase of a pressure loss due to the particulates deposited in the filter with an elapse of time). For the sake of the elimination of such a disadvantage, there has been proposed a honeycomb structure constituted as a bonded honeycomb segment article in which a plurality of honeycomb segments are integrally bonded on mutual bonding surfaces thereof via bonding material layers to thereby reduce the thermal stress.

However, a honeycomb structure of silicon carbide (SiC) has a merit of an excellent thermal resistance, and its use is expected. However, the honeycomb structure of silicon carbide has shortcomings that its thermal expansion coefficient is larger than that of a honeycomb structure made of a cordierite and it is poor in a thermal shock resistance. Therefore, there is a disadvantage that it is difficult to sufficiently utilize the merit. In recent years, with enlargement of the filter, the thermal stress generated during the use and the regeneration of the filter has increased more remarkably than before, with the result that a frequency of the generation of the defect based on the thermal stress and a degree of the defect have rapidly become serious.

To cope with such a disadvantage, there is disclosed a method of manufacturing a ceramic structure (honeycomb structure) including steps of forming an adhesive paste layer (bonding material layer) on a side surface of a porous ceramic member (honeycomb segment) so that the layer occupies 60% or more of a total area of this side surface; then repeating a step of laminating another porous ceramic member; and assembling a ceramic block (see Patent Document 1).

However, in the ceramic structure (honeycomb structure) disclosed in Patent Document 1, a rigid bonding structure conversely increases the thermal stress generated from a temperature gradient. Moreover, a thermal capacity of a bonding member is large and a temperature rise/drop speed is low as compared with the porous ceramic member. Therefore, for a reason that the temperature gradient in the filter is easily increased, the generation of the defect due to the thermal stress cannot necessarily sufficiently be prevented.

Moreover, when the honeycomb structure is used in the DPF, there is a problem that owing to the temperature gradient during the burning of the deposited soot, especially in forced regeneration of the filter due to excessively deposited soot, a local thermal stress is generated in a gas inflow axis direction of the honeycomb structure, a pull crack (a ring of crack) is generated in a ring direction of a honeycomb substrate, and the DPF is destroyed. Since this ring of crack is generated, a limit of the crack generated at a temperature lower than a heat-resistant limit temperature of a material of the honeycomb substrate is a soot deposit limit, and a performance of the material of the honeycomb substrate cannot sufficiently be utilized.

[Patent Document 1] Japanese Patent Application Laid-Open No. 2002-219317

SUMMARY OF THE INVENTION

The present invention has been developed in view of the above-described problems, and an object thereof is to provide a honeycomb structure capable of largely inhibiting generation of a crack due to a thermal stress during use and regeneration of a collection filter for an exhaust gas, especially a diesel particulate filter (DPF) which collects particulates in the exhaust gas of a diesel engine, especially a crack (especially, a ring of crack) in an axial direction of the DPF, so that a soot deposit limit can largely be raised.

To achieve the above object, according to the present invention, the following honeycomb structure is provided.

[1] A honeycomb structure comprising: a bonded honeycomb segment article in which a plurality of honeycomb segments are integrally bonded on mutual bonding surfaces thereof via bonding material layers; and an outer peripheral coating layer which covers an outer peripheral surface of the bonded honeycomb segment article, the honeycomb structure having a structure in which a plurality of cells constituting fluid channels are arranged in parallel with one another in a central axis direction, wherein in each of the honeycomb segments, solid cells are beforehand arranged in four corners of each of opposite end faces of the honeycomb segment and/or the center of each side of an outer peripheral portion of each of the opposite end faces of the honeycomb segment, and the solid cells are integrated with the honeycomb segment.

[2] The honeycomb structure according to [1], wherein the mutually opposite end faces in the adjacent cells of each honeycomb segment are plugged with a filling material.

[3] A honeycomb structure comprising: a bonded honeycomb segment article in which a plurality of honeycomb segments are integrally bonded on mutual bonding surfaces thereof via bonding material layers; and an outer peripheral coating layer which covers an outer peripheral surface of the bonded honeycomb segment article, the honeycomb structure having a structure in which a plurality of cells constituting fluid channels are arranged in parallel with one another in a central axis direction, wherein in each of the honeycomb segments, a solid cell is beforehand arranged in the center of each of opposite end faces of the honeycomb segment, and the solid cells are integrated with the honeycomb segment.

[4] The honeycomb structure according to [3], wherein the mutually opposite end faces in the adjacent cells of each honeycomb segment are plugged with a filling material.

[5] The honeycomb structure according to any one of [1] to [4], wherein a total number of the solid cells in a section of the honeycomb segment perpendicular to an axial direction is 0.1 to 10% of a total number of the cells including the solid cells in the section of the honeycomb segment perpendicular to the axial direction.

The honeycomb structure of the present invention can largely inhibit the generation of the crack due to the thermal stress during the use and the regeneration of the collection filter for the exhaust gas, especially the diesel particulate filter (DPF) which collects the particulates in the exhaust gas of the diesel engine, especially the crack (especially the ring of crack) in a direction perpendicular to the axial direction of the DPF, so that the soot deposit limit can largely be raised.

DESCRIPTION OF THE PREFERRED EMBODIMENT

A honeycomb structure of the present invention will be described hereinafter in detail based on a specific embodiment, but the present invention is not limited to this embodiment when interpreted, and can variously be altered, modified and improved based on knowledge of a person skilled in the art without departing from the scope of the present invention.

Figure 1:
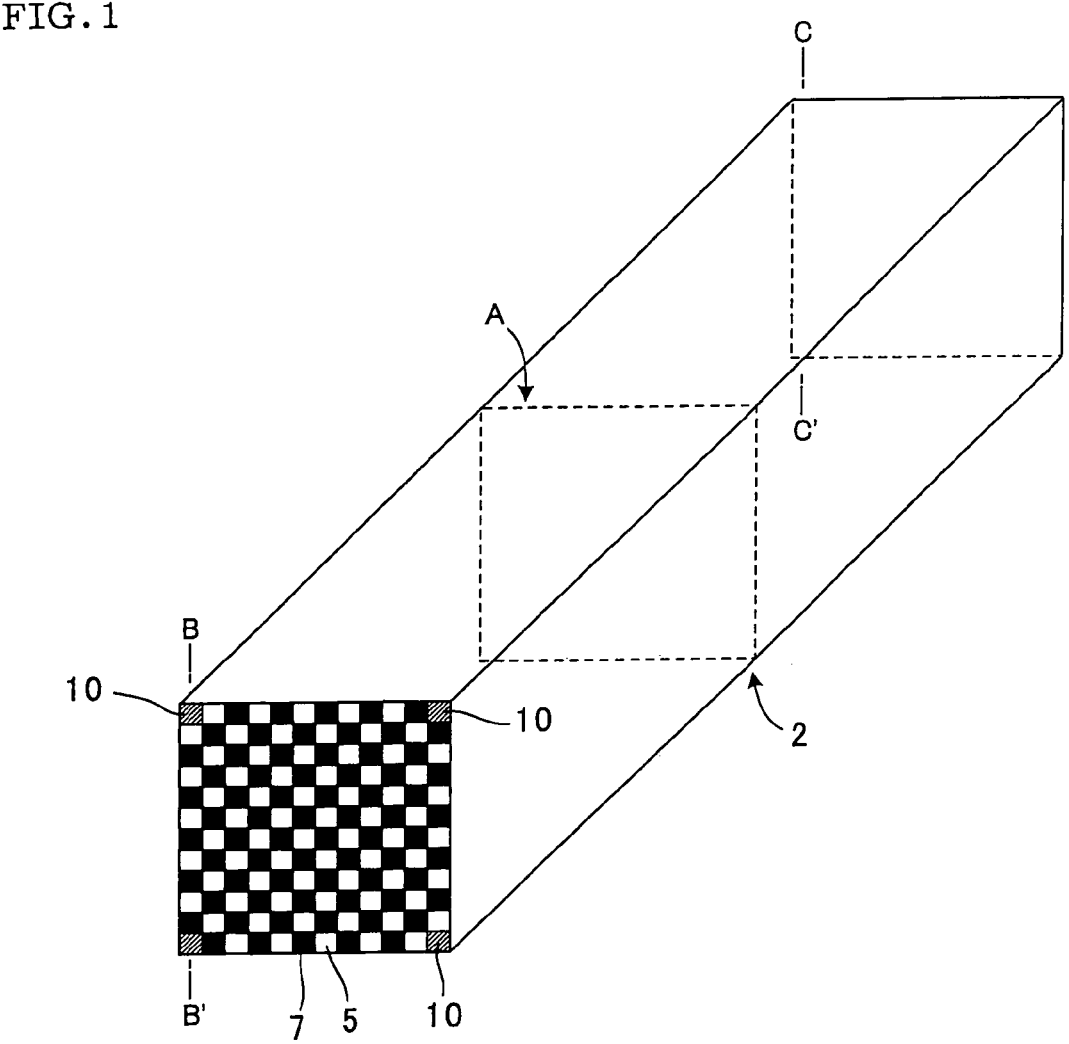
FIG. 1 is a schematic perspective view showing one example of a honeycomb segment for use in the present invention.
Figure 2:
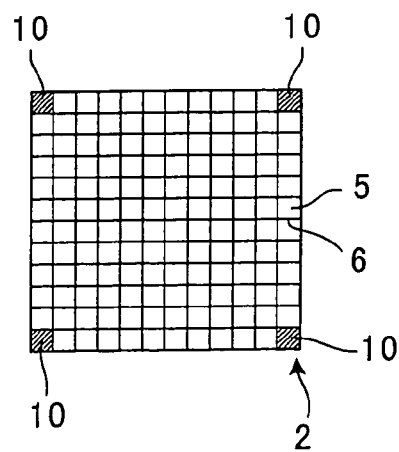
FIG. 2 is a sectional view of the A part of FIG. 1.
Figure 3:
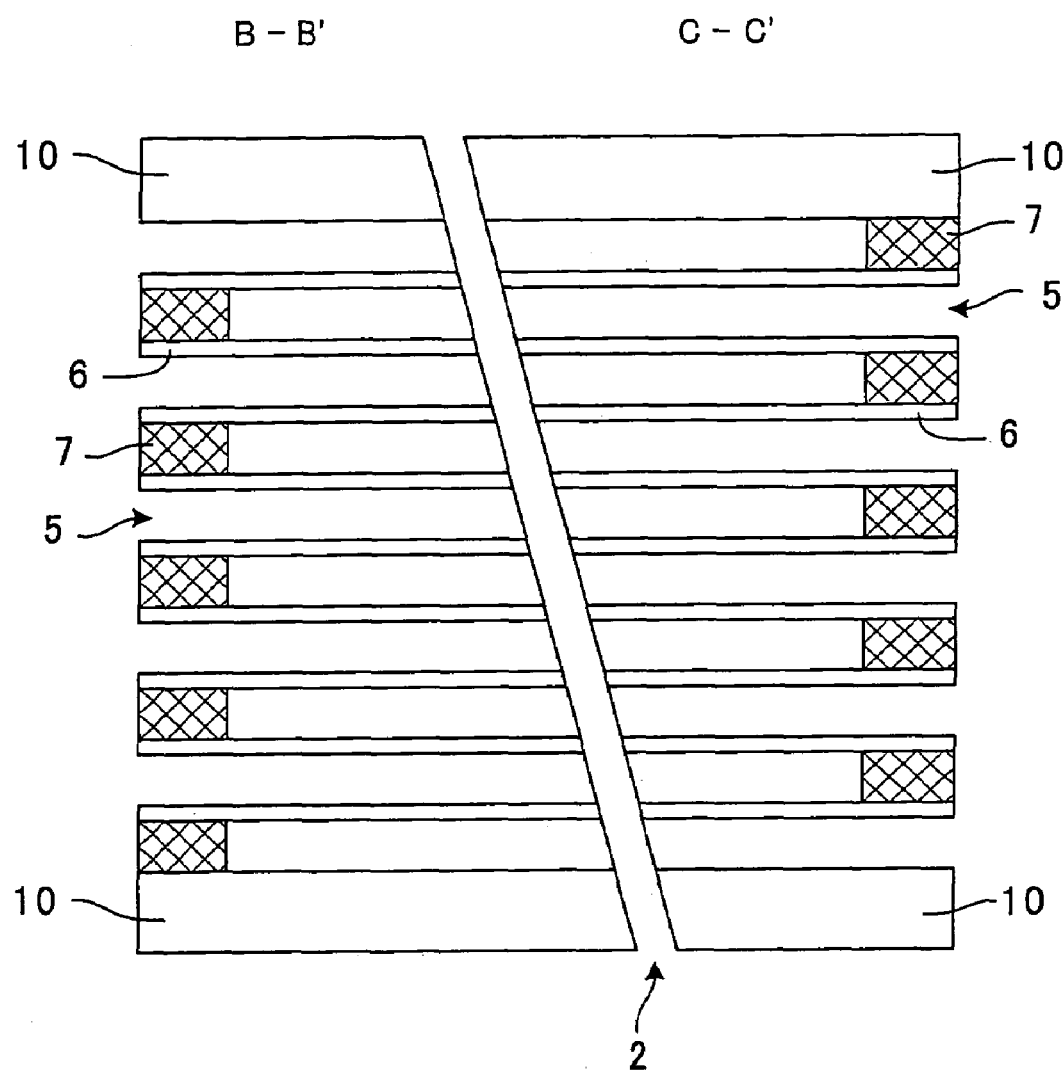
FIG. 3 is a sectional view cut along the B-B' and C-C' lines of FIG. 1.
Figure 4:
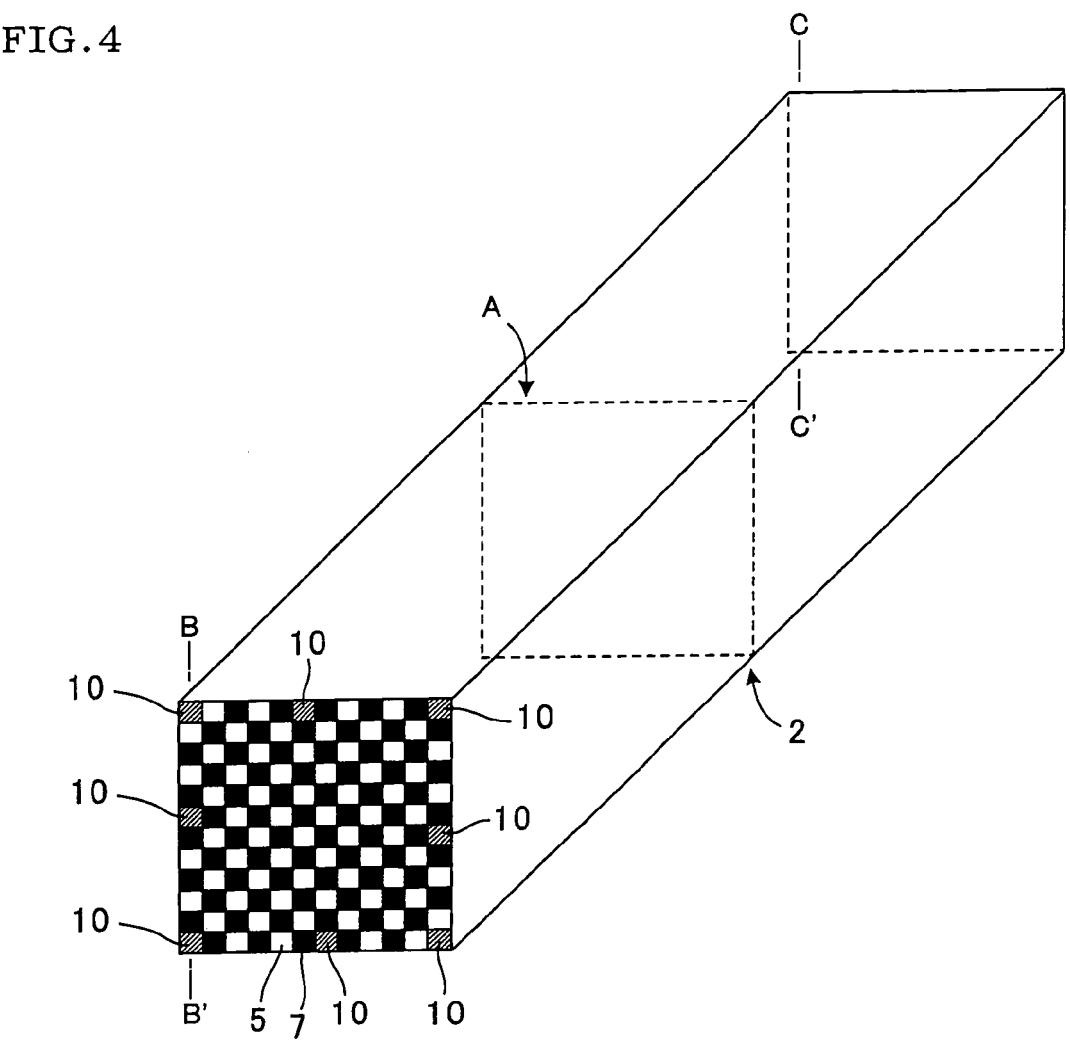
FIG. 4 is a schematic perspective view showing another example of the honeycomb segment for use in the present invention.
Figure 5:
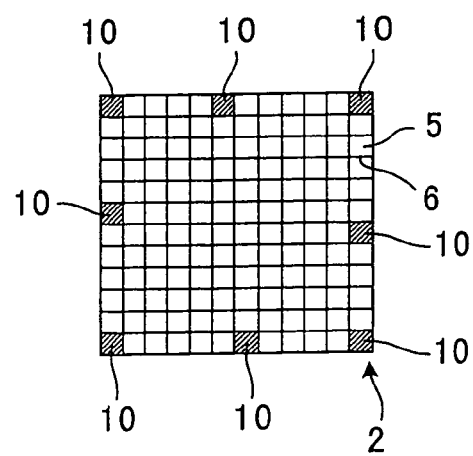
FIG. 5 is a sectional view of the A part of FIG. 4.
Figure 6:
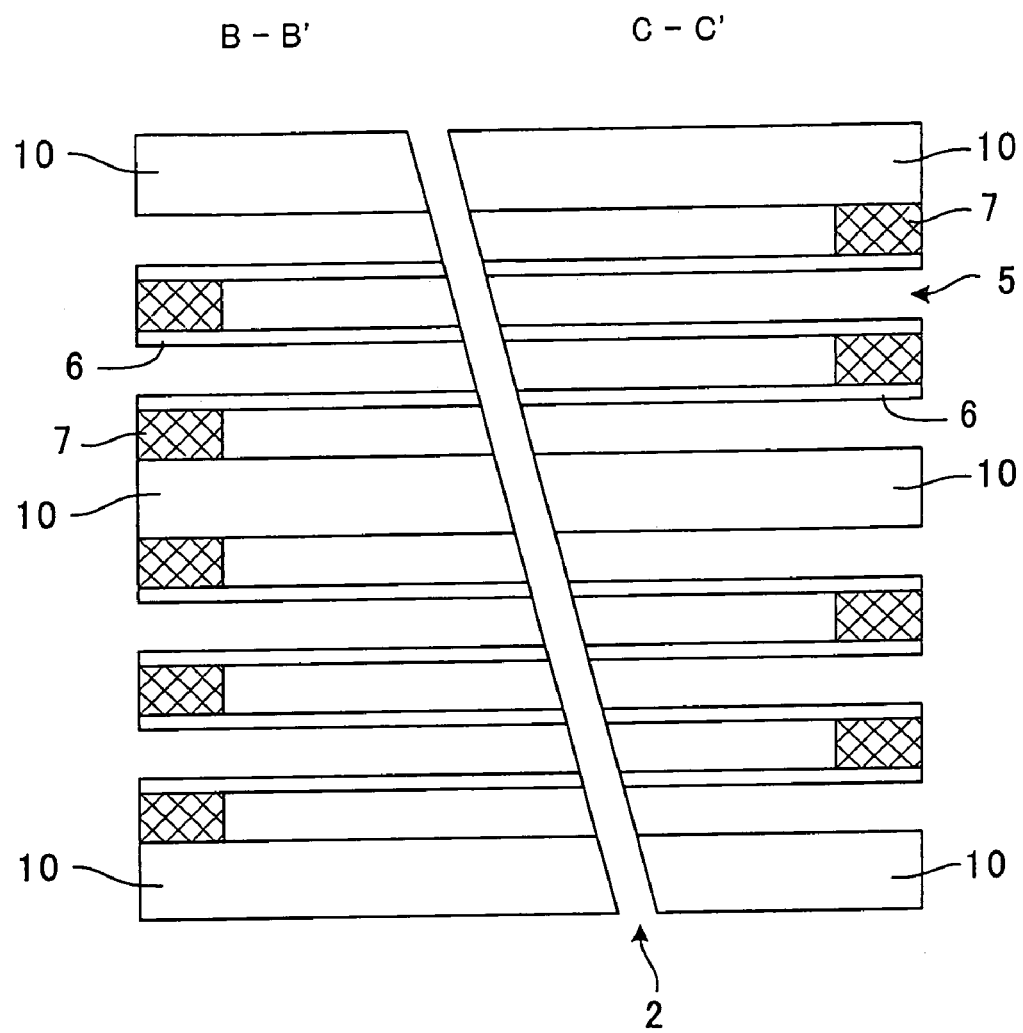
FIG. 6 is a sectional view cut along the B-B' and C-C' lines of FIG. 4.
Figure 7:
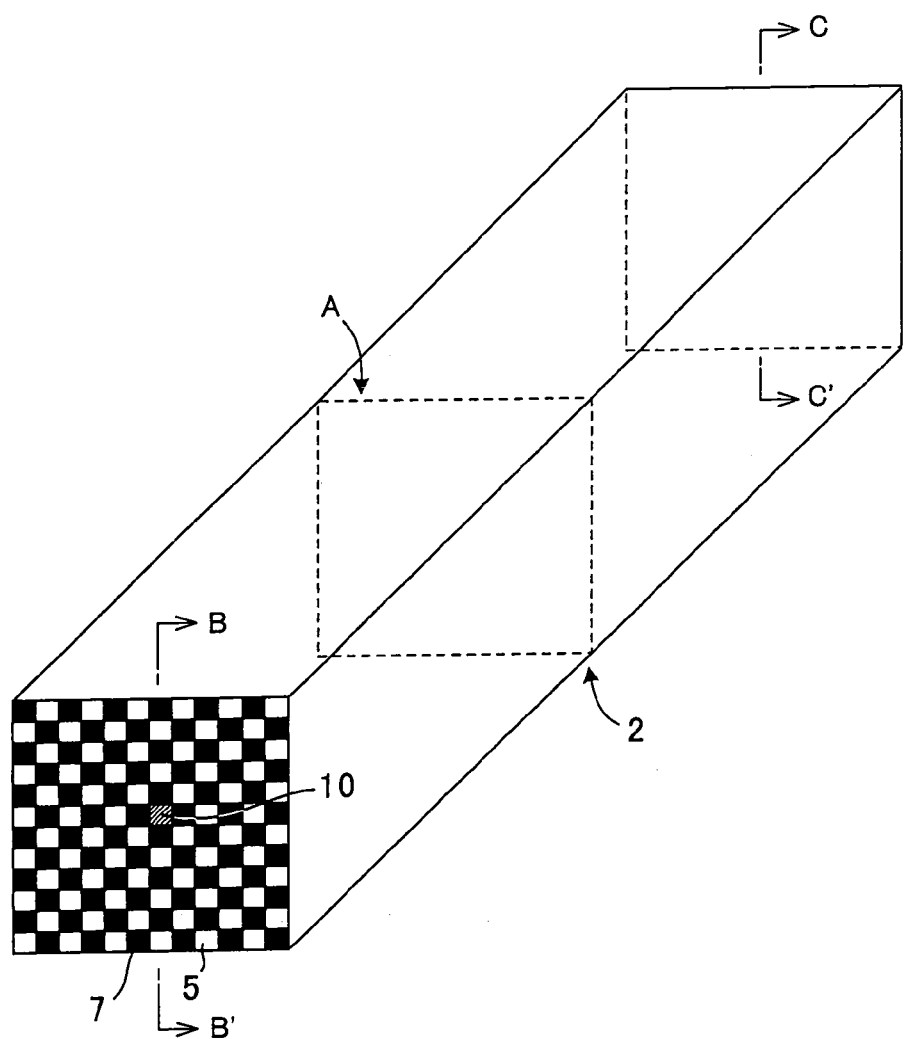
FIG. 7 is a schematic perspective view showing still another example of the honeycomb segment for use in the present invention.
Figure 8:
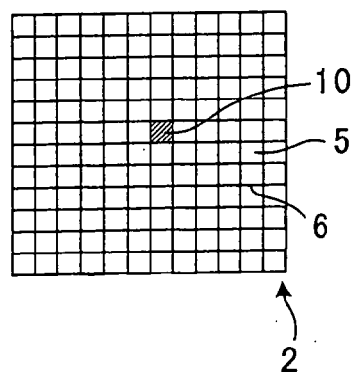
FIG. 8 is a sectional view of the A part of FIG. 7.
Figure 9:
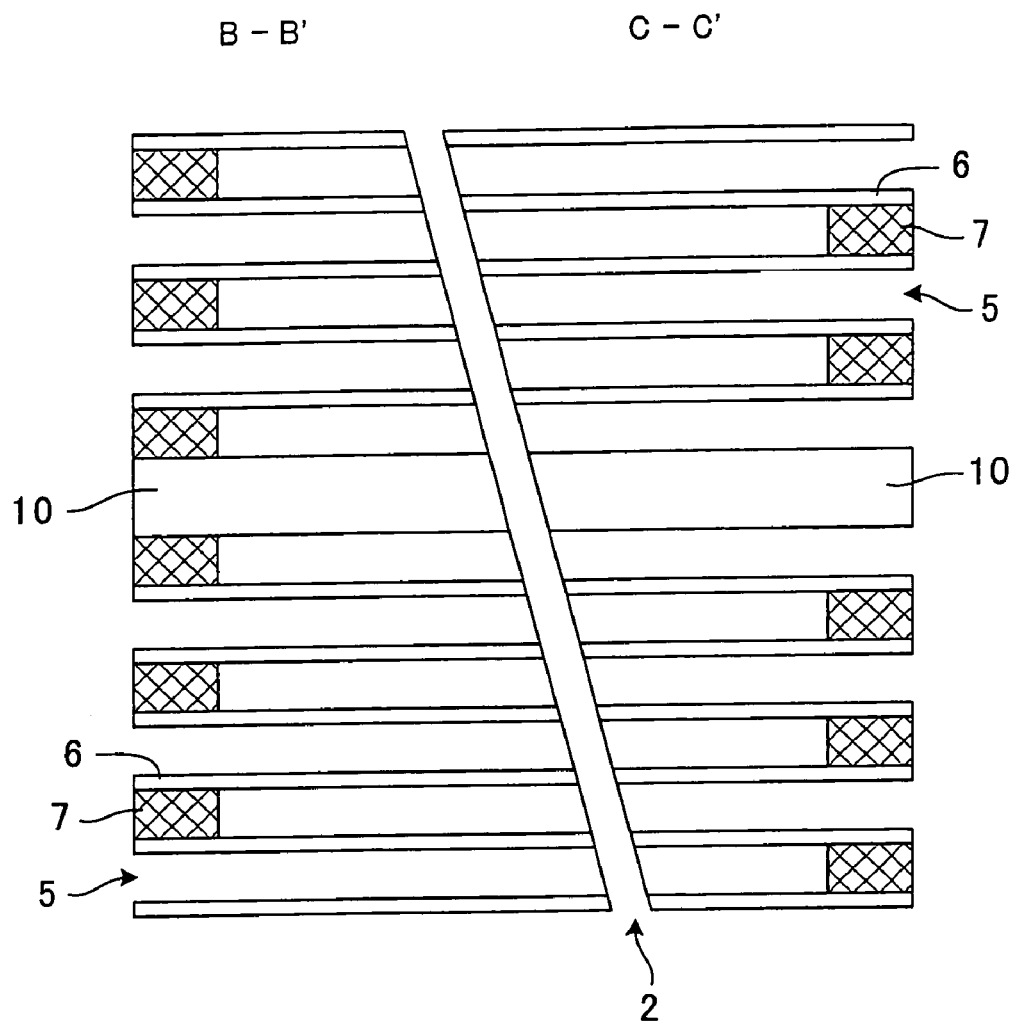
FIG. 9 is a sectional view cut along the B-B' and C-C' lines of FIG. 7.
Figure 10:
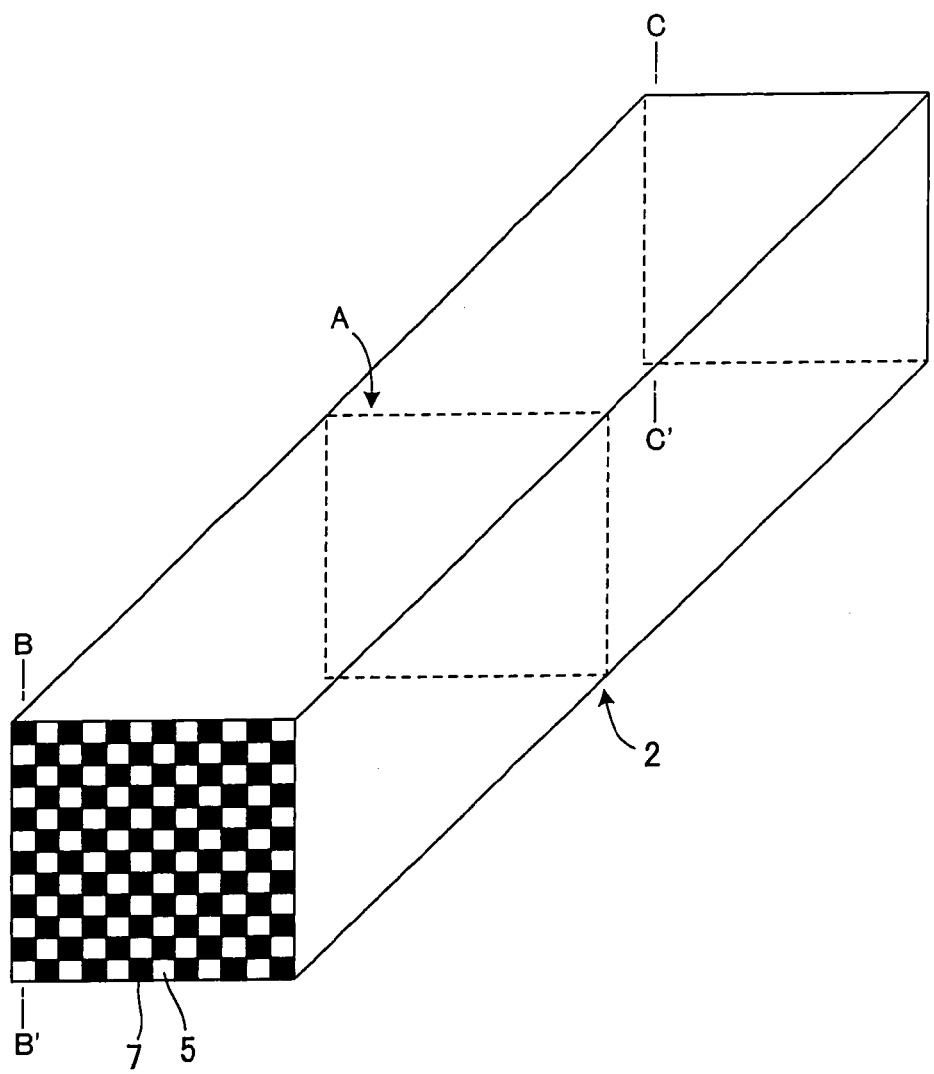
FIG. 10 is a schematic perspective view showing one example of a honeycomb segment heretofore used.
Figure 11:
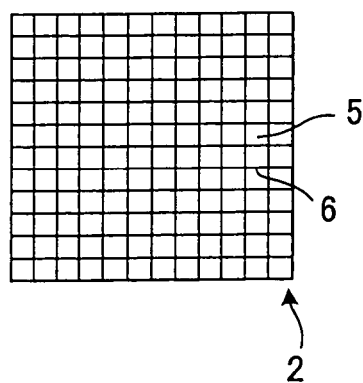
FIG. 11 is a sectional view of the A part of FIG. 10.
Figure 12:
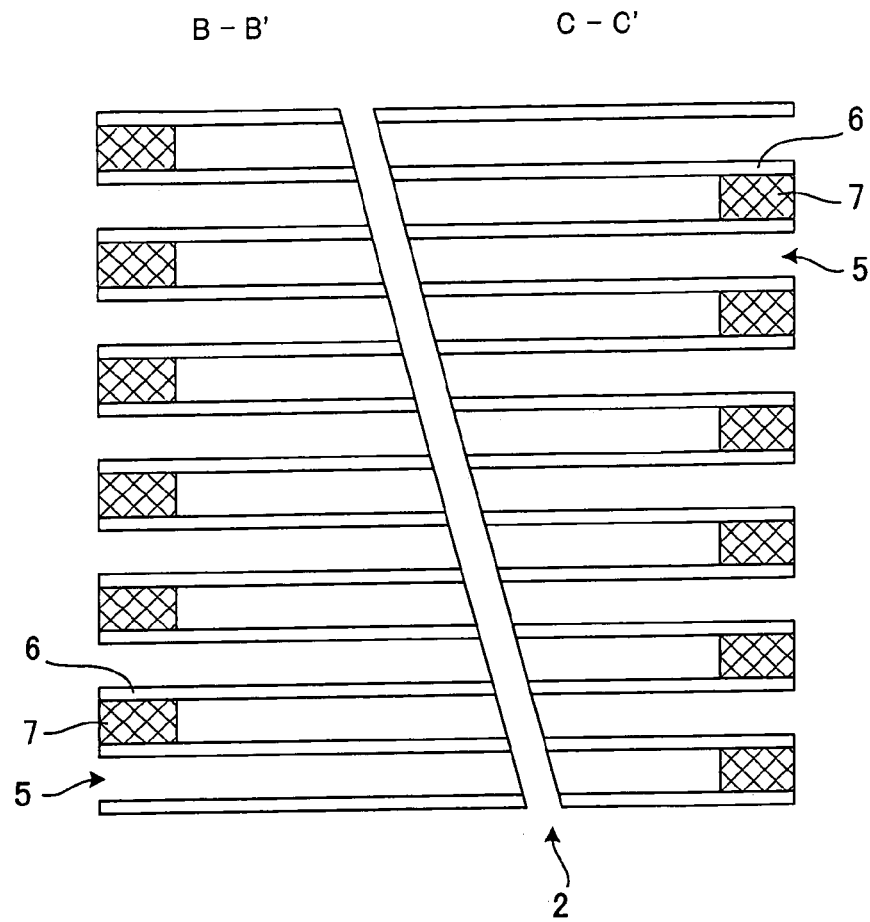
FIG. 12 is a sectional view cut along the B-B' and C-C' lines of FIG. 10.

FIG. 1 is a schematic perspective view showing one example of a honeycomb segment for use in the present invention; FIG. 2 is a sectional view of the A part of FIG. 1; FIG. 3 is a sectional view cut along the B-B' and C-C' lines of FIG. 1; FIG. 4 is a schematic perspective view showing another example of the honeycomb segment for use in the present invention; FIG. 5 is a sectional view of the A part of FIG. 4; and FIG. 6 is a sectional view cut along the B-B' and C-C' lines of FIG. 4. FIG. 7 is a schematic perspective view showing still another example of the honeycomb segment for use in the present invention; FIG. 8 is a sectional view of the A part of FIG. 7; FIG. 9 is a sectional view cut along the B-B' and C-C' lines of FIG. 7; FIG. 10 is a schematic perspective view showing one example of a honeycomb segment heretofore used; FIG. 11 is a sectional view of the A part of FIG. 10; FIG. 12 is a sectional view cut along the B-B' and C-C' lines of FIG. 10; and FIG. 13 is a schematic perspective view of one example of an embodiment (the whole structure cut along a plane perpendicular to a central axis has a circular sectional shape) of a honeycomb structure.

Figure 13:
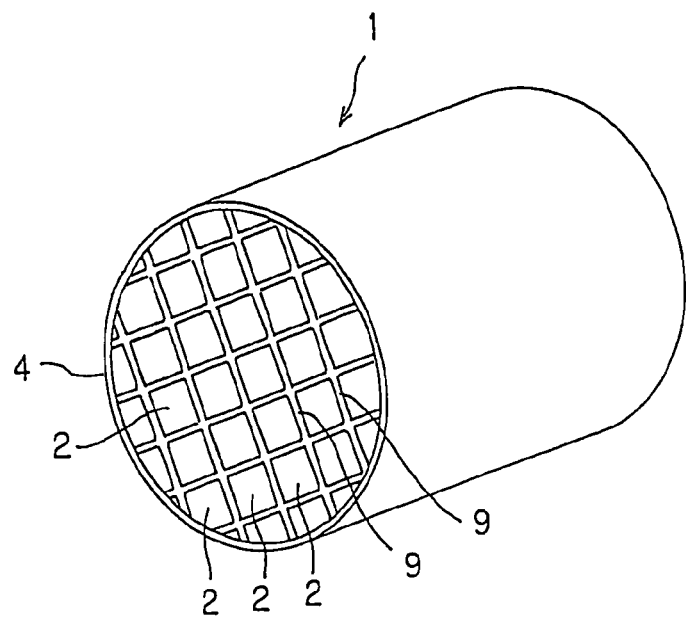
FIG. 13 is a schematic perspective view of one example of an embodiment (the whole structure cut along a plane perpendicular to a central axis has a circular sectional shape) of a honeycomb structure.

As shown in, for example, FIG. 13, a honeycomb structure of the present invention is a honeycomb structure 1 including a bonded honeycomb segment article in which a plurality of honeycomb segments 2 are integrally bonded on mutual bonding surfaces thereof via bonding material layers 9; and an outer peripheral coating layer 4 which covers an outer peripheral surface of the bonded honeycomb segment article. The honeycomb structure has a structure in which a plurality of cells constituting fluid channels are arranged in parallel with one another in a central axis direction.

Moreover, each of the honeycomb segments 2 has a shape constituting a part of the whole structure of the honeycomb structure 1 (bonded honeycomb segment article), and has such a shape as to constitute the whole structure, when the honeycomb segments are assembled in a direction perpendicular to a central axis of the honeycomb structure 1. Cells 5 are arranged in parallel with one another in the central axis direction of the honeycomb structure 1, and mutual end portions of the adjacent cells 5 are plugged with a filling material 7.

At this time, in one example of the honeycomb segment for use in the present invention, as shown in, for example, FIGS. 1 and 2, solid cells 10 are beforehand arranged in four corners of each of opposite end faces of the honeycomb segment 2. Moreover, as shown in FIG. 3, the solid cells 10 are integrated with the honeycomb segments 2.

Moreover, in another example of the honeycomb segment for use in the present invention, as shown in, for example, FIGS. 4 and 5, the solid cells 10 are beforehand arranged in four corners of each of the opposite end faces of the honeycomb segments 2 and the center of each side of an outer peripheral portion of each of the opposite end faces of the honeycomb segment 2. Moreover, as shown in FIG. 6, the solid cells are integrated with the honeycomb segment 2.

Furthermore, in still another example of the honeycomb segment for use in the present invention, as shown in, for example, FIGS. 7 and 8, the solid cell 10 is beforehand disposed in the center of each of the opposite end faces of the honeycomb segment 2. Moreover, as shown in FIG. 9, the solid cell 10 is integrated with the honeycomb segment 2.

That is, a main characteristic of the honeycomb segment for use in the present invention lies in that during extrusion molding of the honeycomb segment before the end faces of the adjacent cells on the mutually opposite sides are plugged with the filling material, the solid cells are simultaneously formed in predetermined places (especially, four corners and the center).

In consequence, the honeycomb segment of the present invention can increase a structural strength of the honeycomb segment, and bends of the honeycomb segment can be reduced. The solid cells increase a thermal capacity of the honeycomb segment.

Moreover, in a case where the honeycomb segment for use in the present invention is applied to a honeycomb structure (e.g., DPF), even when a local thermal stress is generated in a gas inflow axis direction of the honeycomb structure, it is possible to inhibit generation of a ring of crack (crack having a peripheral direction of the honeycomb structure) by the increase of the structural strength by the solid cells. When the thermal capacity of the honeycomb segment is increased, a temperature rise during regeneration can be inhibited. Therefore, the generated thermal stress can be suppressed. The maximum temperature during the regeneration generally appears in the center of the honeycomb segment. Therefore, to dispose the solid cell in the center of the honeycomb segment is effective for the suppression of the temperature rise. Owing to this effect, the solid cell can inhibit destruction of the honeycomb structure (DPF), a performance of a material of a honeycomb substrate is sufficiently utilized, and a soot deposit limit of the honeycomb structure (DPF) can be raised.

Furthermore, when the solid cell is disposed in the center of the segment, even one solid cell can effectively inhibit the destruction of the honeycomb structure. When a ratio of the solid cells is increased, the effects of the increase of the structural strength of the segment and the increase of the thermal capacity become remarkable. More effectively, the destruction of the honeycomb structure can be inhibited, but on the other hand, a pressure loss increases owing to reduction of a filter area. It is preferable that to suppress the increase of the pressure loss in a practically allowable range, a total number of the solid cells is set to 10% or less of a total number of the cells (including the solid cells) of the segment. In more detail, it is preferable that the total number of the solid cells in a section of the honeycomb segment perpendicular to an axial direction is 0.1 to 10% (more preferably, 1.5 to 6%) of the total number of the cells including the solid cells in the section of the honeycomb segment perpendicular to the axial direction.

As a material of the honeycomb segment 2 for use in the present invention, from viewpoints of strength and thermal resistance, it is preferable to use at least one selected from the group consisting of silicon carbide, a silicon-silicon carbide based composite material, silicon nitride, cordierite, mullite, alumina, spinel, a silicon carbide-cordierite based composite material, a silicon-silicon carbide composite material, lithium aluminum silicate, aluminum titanate and an Fe—Cr—Al based metal. Above all, silicon carbide or the silicon-silicon carbide based composite material is preferable.

Next, preparation of the honeycomb segment 2 can be performed by, for example, adding, to the material appropriately selected from the above-described materials, a binder such as methyl cellulose, hydroxypropoxyl cellulose, hydroxyethyl cellulose, carboxymethyl cellulose or polyvinyl alcohol, a surfactant, water as a solvent and the like to obtain a plastic clay; extruding the clay from a die prepared so that the clay is formed into the above-described shape; drying the clay by a microwave, hot air or the like; and then sintering the clay.

As the filling material 7 for use in plugging the cell 5, a material similar to that of the honeycomb segment 2 can be used. The plugging with the filling material 7 can be performed by submerging the end face of the honeycomb segment 2 in a slurry of the filling material 7 to fill in the opened cells 5 in a state in which the cells 5 that are not to be plugged are masked. The filling with the filling material 7 may be performed before or after firing after the honeycomb segment 2 is formed, but it is preferable to perform the filling before the firing, because a firing step ends once.

After preparing the honeycomb segment 2 as described above, an outer peripheral surface of the honeycomb segment 2 is coated with a slurry of the bonding material layer (partial bonding material layer) 9, and a plurality of honeycomb segments 2 are assembled so as to obtain a predetermined three-dimensional shape (the whole structure of the honeycomb structure 1). After the assembled segments are attached to one another under pressure, they are heated and dried. Thus, a bonded article in which a plurality of honeycomb segments 2 are integrally bonded is prepared. Subsequently, this bonded article is ground into the above shape, an outer peripheral surface of the article is coated with the coating material, and the article is heated and dried. The honeycomb structure 1 is prepared in this manner as shown in FIG. 13.

When the bonding material layer (partial bonding material layer) 9 for use in the present invention is applied to the outer peripheral surface of the honeycomb segment 2, the layer functions so as to bond the honeycomb segments 2. As an example of formation of the bonding material layer (partial bonding material layer) 9, after preparing the honeycomb segment 2, the outer peripheral surface of the honeycomb segment 2 is coated with the slurry of the bonding material layer 9, a plurality of honeycomb segments 2 are assembled so as to obtain the predetermined three-dimensional shape (the whole structure of the honeycomb structure 1), the assembled segments are attached to one another under pressure, and they are then heated and dried. In this case, the layers may be applied to the outer peripheral surfaces of the adjacent honeycomb segments 2, or the layer may be applied to one of the corresponding outer peripheral surfaces between the adjacent honeycomb segments 2.

Such application to one of the corresponding surfaces is preferable in that a use amount of the bonding material layer (partial bonding material layer) 9 can be saved. A thickness of the bonding material layer (partial bonding material layer) 9 is described in consideration of a bonding force between the honeycomb segments 2, and is appropriately selected in a range of, for example, 0.2 to 4.0 mm.

Preferable examples of the bonding material layer (partial bonding material layer) 9 for use in the present invention include an inorganic fiber, an inorganic bonder, an organic binder and a layer constituted of inorganic particles. Specifically, examples of the inorganic fiber include an oxide fiber of alumino silicate, alumina or the like, and another fiber (e.g., an SiC fiber). Examples of the inorganic binder include silica sol, alumina sol and clay. Examples of the organic binder include polyvinyl alcohol (PVA), carboxymethyl cellulose (CMC) and methyl cellulose (MC). Examples of the inorganic particles include ceramics such as silicon carbide, silicon nitride, cordierite, alumina and mullite.

The outer peripheral coating layer 4 is applied to the outer peripheral surface of the bonded article of the honeycomb segments 2, and functions so as to protect the outer peripheral surface of the bonded article of the honeycomb segments 2. A thickness of the outer peripheral coating layer 4 is appropriately selected in a range of, for example, 0.1 to 1.5 mm.

It is preferable that thermal conductivities of the bonding material layer (partial bonding material layer) 9 and the outer peripheral coating layer 4 are 0.1 to 5.0 W/m·k. It is preferable that thermal expansion coefficients of the bonding material layer (partial bonding material layer) 9 and the outer peripheral coating layer 4 are comparatively small in order to prevent a crack from being generated by a thermal shock or the like, and are preferably in a range of $1 \times 10^{-6}$ to $8 \times 10^{-6}/°$ C.

EXAMPLES

The present invention will be described hereinafter in more detail in accordance with examples, but the present invention is not restricted by these examples.

(Preparation of Honeycomb Segment)

As honeycomb segment materials, SiC powder and metal Si powder were mixed at a mass ratio of 80:20. As pore formers, starch and foamed resin were added to the mixed powder. Furthermore, methyl cellulose, hydroxypropoxyl methyl cellulose, a surfactant and water were added to the powder to prepare a plastic clay.

The clay was extruded using a die, and dried with a microwave and hot air to obtain a formed honeycomb segment article having a partition wall thickness of 31 μm and a cell density of about 46.5 cells/cm$^2$ (300 cells/square inch). A section of the article was a regular tetragon having one side of 35 mm, and a length of the article was 152 mm.

Next, opposite end faces of cells were plugged so that end faces of the formed honeycomb segment article exhibited a checkered pattern shape. That is, the plugging was performed so that the adjacent cells were closed by end portions opposite to each other. As a plugging material, a material similar to the honeycomb segment material was used. After the opposite end faces of the cells were plugged and dried, the article was degreased in an outside air atmosphere at about 400° C. Subsequently, the article was fired in an Ar inactive atmosphere at about 1450° C. to obtain a honeycomb segment having a porous structure in which SiC crystal particles were bonded by Si.

(Preparation of Bonding Material)

An aluminosilicate fiber as an inorganic fiber, colloidal silica and clay as inorganic binders and SiC as inorganic particles were mixed, and water was further added to the resultant material. If necessary, an organic binder (CMC, PVA), a foamed resin and a dispersant were added to the material, and the material was kneaded with a mixer for 30 minutes to obtain a pasted bonded article.

(Preparation of Honeycomb Structure)

An outer wall surface of the honeycomb segment was coated with a bonding material in a thickness of about 1 mm to form a bonding material layer. Subsequently, a step of laminating another honeycomb segment on the coated surface was repeated to prepare a laminated honeycomb segment article constituted of sixteen honeycomb segments. An external pressure was applied to the article, and the whole article was bonded. Subsequently, the article was dried at 140° C. for two hours to obtain a bonded honeycomb segment article. Subsequently, an outer periphery of the bonded honeycomb segment article was ground into a cylindrical shape, a coating material was applied, and the article was dried at 700° C. for two hours to harden, thereby obtaining a honeycomb structure.

Examples 1 to 3, Comparative Example

In Example 1, a die was prepared so that a cell positioned closest to the center of a section was solid, and the resultant formed honeycomb segment article had a structure which realized this (one solid cell was disposed in the vicinity of the center of the section) (see FIG. 8). A honeycomb segment finally used in preparation of a honeycomb structure had a shape shown in FIG. 7. It is to be noted that the die to mold the solid cell can be obtained by, for example, removing a cell block corresponding to the solid cell from a die for extrusion-molding a usual honeycomb structure.

In Example 2, a die was prepared so that cells positioned in four corners of a section were solid, and the resultant formed honeycomb segment article had a structure which realized this (solid cells were arranged in the four corners of the section) (see FIG. 2). A honeycomb segment finally used in preparation of a honeycomb structure had a shape shown in FIG. 1.

In Example 3, a die was prepared so that cells disposed in the vicinity of the center of each of four sides of an outermost periphery in addition to the positions of Example 2 were solid, and the resultant formed honeycomb segment article had a structure which realized this (one solid cell was disposed in each of the four corners of a section and one solid cell was disposed in the vicinity of the center of each of the four sides) (see FIG. 5). A honeycomb segment finally used in preparation of a honeycomb structure had a shape shown in FIG. 4.

In a comparative example, a die for use during extrusion molding was designed in a structure having the whole uniform surface, and the resultant formed honeycomb segment article had a honeycomb structure in which cells were uniformly arranged in the whole surface (see FIG. 11). A honeycomb segment finally used in preparation of a honeycomb structure had a shape shown in FIG. 10.

(Evaluation)

In the honeycomb structures obtained in Examples 1 to 3 and the comparative example, a rapid heating test (burner spalling test: "B-sp" test) was performed. Moreover, each bonded honeycomb article was cut to observe a cut surface, and generation of a defect was measured. Results are shown in Table 1.

It is to be noted that the rapid heating test (burner spalling test: "B-sp" test) is a test in which air heated with a burner is circulated through a honeycomb structure to thereby make a temperature difference between the center and an outer portion, a thermal shock resistance is evaluated by a limit temperature at which any crack is not generated in the honeycomb structure, and a situation under deposited soot burning (regeneration) during actual use is simulated (the higher the temperature is, the higher the thermal shock resistance is). Here, in Table 1, a case where any defect was not generated in a bonded article (cut surface) was evaluated as circle, and a case where the defect was generated was evaluated as cross.

TABLE 1

| | Places where solid cells are arranged and number of cells | Maximum temperature (° C.) in targeted DPF | | | |
|---|---|---|---|---|---|
| | | 600 | 650 | 700 | 800 |
| Example 1 | One cell in segment section center | ○ | ○ | x | x |
| Example 2 | One cell in each of four corners of segment section, four cells in total | ○ | ○ | ○ | x |
| Example 3 | One cell in each of four corners of segment section, one cell in the vicinity of center of each of four sides, eight cells in total | ○ | ○ | ○ | x |
| Comparative example | Nil | ○ | x | x | x |

From the results of table 1, it has been found that in Examples 1 to 3 in which the segments are provided with the solid cells, a generation temperature of the defect rises, and a performance is enhanced as compared with the comparative example.

A honeycomb structure of the present invention is useful as a collection filter for an exhaust gas, for example, a diesel particulate filter (DPF) for collecting and removing particulates included in the exhaust gas from a diesel engine or the like.

What is claimed is:

1. A honeycomb structure comprising:
   a bonded honeycomb segment article in which a plurality of honeycomb segments are integrally bonded on mutual bonding surfaces thereof via bonding material layers; and
   an outer peripheral coating layer which covers an outer peripheral surface of the bonded honeycomb segment article,
   the honeycomb structure having a structure in which a plurality of cells constituting fluid channels are arranged in parallel with one another in a central axis direction, wherein in each of the honeycomb segments, solid cells are beforehand arranged in four corners of each of opposite end faces of the honeycomb segment and/or the center of each side of an outer peripheral portion of each of the opposite end faces of the honeycomb segment, and the solid cells are integrated with the honeycomb segment.

2. The honeycomb structure according to claim 1, wherein the mutually opposite end faces in the adjacent cells of each honeycomb segment are plugged with a filling material.

3. A honeycomb structure comprising: a bonded honeycomb segment article in which a plurality of honeycomb segments are integrally bonded on mutual bonding surfaces thereof via bonding material layers; and an outer peripheral coating layer which covers an outer peripheral surface of the bonded honeycomb segment article, the honeycomb structure having a structure in which a plurality of cells constituting fluid channels are arranged in parallel with one another in a central axis direction, wherein in each of the honeycomb segments, a solid cell is beforehand arranged in the center of each of opposite end faces of the honeycomb segment, and the solid cells are integrated with the honeycomb segment.

4. The honeycomb structure according to claim 3, wherein the mutually opposite end faces in the adjacent cells of each honeycomb segment are plugged with a filling material.

5. The honeycomb structure according to claim 1, wherein a total number of the solid cells in a section of the honeycomb segment perpendicular to an axial direction is 0.1 to 10% of a total number of the cells including the solid cells in the section of the honeycomb segment perpendicular to the axial direction.

6. The honeycomb structure according to claim 3, wherein a total number of the solid cells in a section of the honeycomb segment perpendicular to an axial direction is 0.1 to 10% of a total number of the cells including the solid cells in the section of the honeycomb segment perpendicular to the axial direction.

7. The honeycomb structure according to claim 1, wherein the solid cells are made of the same material as the honeycomb segments.

8. The honeycomb structure according to claim 3, wherein the solid cells are made of the same material as the honeycomb segments.

* * * * *